Patented Nov. 28, 1933

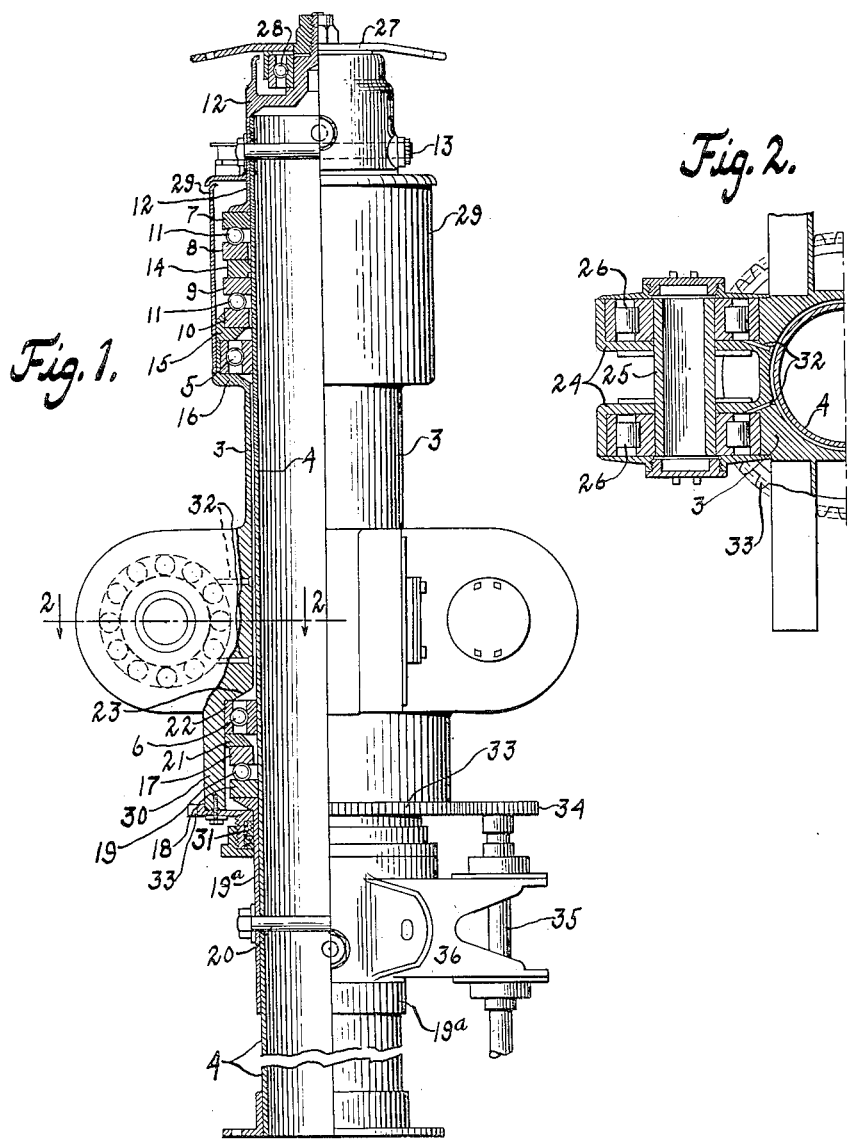

1,936,752

UNITED STATES PATENT OFFICE 1,936,752

AIRCRAFT WITH ROTATIVE SUSTAINING BLADES

Juan de la Cierva, Madrid, Spain, assignor to Autogiro Company of America, Philadelphia, Pa., a corporation of Delaware Original application November 1, 1926, Serial No. 145,655. Divided and this application November 26, 1930, Serial No. 498,299, and in Great Britain November 19, 1925

16 Claims. (Cl. 244—19)

This invention relates to aircraft with rotative sustaining blades and is more particularly concerned with the supporting or mounting structure for blades or wings of this character. This application is a division of my co-pending application Serial Number 145,655, filed November 1st, 1926.

In addition, it should be noted that the present invention is particularly useful in connection with sustaining rotor constructions in which the blades or wings are arranged to be actuated by relative air-flow such as results from movement of the craft through the atmosphere.

In general, the present invention contemplates the use of a simple, rugged and convenient supporting or mounting structure for rotative sustaining blades for aircraft. More specifically the present invention has in view the provision of anti-friction bearings in the supporting structure which are arranged and disposed in such manner as to take care of thrusts as well as other forces to which such a mounting structure is subjected during operation.

Still further, it is an object of the present invention to provide a novel type of lubrication for various of the working parts in a structure of this character.

Finally, the present invention includes the provision of means associated with a revolving part of the rotor construction for driving or actuating a tachometer or rotor speed indicator.

How the foregoing, together with other objects and advantages are obtained, will be apparent from a consideration of the following description taken with the accompanying drawing, in which;

Figure 1 is a side view, partly in vertical section and partly in elevation, of portions of a mounting structure for rotative sustaining blades, the said structure embodying the improvements of the present invention, and Figure 2 is a horizontal sectional view taken substantially as indicated by the line 2—2 of Figure 1.

Before considering the structure illustrated in the drawing in detail, it should be noted that in aircraft of this general type a plurality of sustaining blades are mounted for rotation about a common axis. In addition, such blades are preferably pivoted or articulated to the supporting structure therefor, in order that they may be free, independently, to assume various positions under the influence of centrifugal, lift, drag, anti-drag and other forces to which the blades are subjected in operation.

With the above in mind, reference should be made first to Figure 1, in which a blade supporting or hub member is indicated in general by the reference numeral 3, the same being mounted for rotation on the upright standard or shaft 4. The standard 4, of course, is supported or secured to the aircraft, preferably above the fuselage or body thereof.

In order to permit free relative rotation of the members 3 and 4, a pair of spaced radial bearings 5 and 6 are preferably positioned therebetween. These bearings are indicated as being of the ball type, although it is to be understood that other forms might be employed. In addition, in order to take the thrusts incident to sustension of the craft by the rotative blades, suitable thrust bearings are arranged between the members 3 and 4.

In this embodiment the thrust bearings are also illustrated as being of the ball type, and from inspection of Figure 1 it will be seen that they include co-operating pairs of ball races 7 and 8, and 9 and 10, with balls 11 positioned between the races of each pair. While two such thrust bearings are illustrated herein, one of which is preferably provided as a precautionary measure, it is to be understood that only one is necessary to satisfactory operation. The two thrust bearings are provided in order that there shall be no interference with the free rotation of the wing system should one or other of said bearings fail. In the arrangement indicated, the upper race 7 is adapted to co-operate with the cap member 12 which forms the tip or top portion of the supporting structure or rotor head and which is rigidly secured to the member 4 as by means of a bolt 13 extending diametrically through the members 12 and 4. The thrust bearings illustrated, furthermore, are spaced apart by means of a ring 14, and the lower race 10 of the lower bearing is adapted to engage an annular member 15 which transmits the upward thrust incident to sustension from the member 3 through the trust bearings to the stationary structure 12 and 4. This transmission of thrust upwardly is effected by means of an external shoulder or flange 16 formed or carried by the rotatable part 3 which co-operates with the annular ring or abutment 15, a portion of the bearing 5 being interposed therebetween in this particular structure.

In addition to the foregoing, I preferably employ a thrust bearing, also of the ball type, including races 17 and 18 between which the balls 19 are arranged, in order to take the thrust or weight of the sustaining blades when they are inactive, or rotating at slow speeds such as are not sufficient to support the craft. The use of such a bearing, is advantageous in taking the shock or downward thrust of the rotor during landing. To this end, the lower race 18 abuts against a co-operating member or collar 19a, which is directly secured to the upright stationary shaft 4 as by means of a bolt 20. This bearing takes the downward thrust or weight of the wing system, preferably through the ring 21 and a part 22 of the bearing 6, the said part co-operating with a shoulder or abutment portion 23 of the hub member 3.

The hub member 3 preferably carries pairs of opposed lugs 24, 24 which in the preferred embodiment are positioned, axially of the hub 3, between the two sets of bearings at the upper and lower ends thereof. The lugs 24, furthermore, are apertured to receive pivot pins 25 (see Fig. 2) on which the blades or suitable blade mounting parts may be mounted, for example, after the manner illustrated in my co-pending application above referred to. In order to provide free pivotal movement of the blades or the blade mounting parts on the pins 25, suitable bearings, such as the roller bearings illustrated at 26 in Figure 2, are operatively associated with the lugs 24 and the pins 25.

At the top of the cap member 12 a device such as indicated at 27 is mounted, preferably on a bearing 28, for rotation with respect to the cap 12 and upright standard 4. This device 27 is provided for the attachment thereto of cables or wires (not shown) which extend therefrom to the sustaining blades in order to support the blades when they are inactive and thus prevent them from fouling on any other part of the craft, such for example as the tail structure or propelling means.

Still further the present invention makes provision for lubrication of various of the rotating parts hereinbefore referred to. The lubrication means here employed includes a reservoir which is formed at least partially between the relatively rotatable members 3 and 4. At its upper end, this reservoir is enlarged into a cavity formed around the upper thrust and radial bearings by means of a cylindrical member 29. At the lower end, the space between the members 3 and 4 is enlarged to take in the lower radial and thrust bearings by means of an additional cylindrical part which, as indicated in the drawing, may be formed integrally with the hub 3. Additionally, and with a view to prevent escape of lubricant from the reservoir, a packing device such as indicated in general at 31, is preferably positioned between the outer surface of the member 19 and the lower edge of the wall 30.

When lubricant is delivered into the reservoir, preferably at the top thereof, it is immediately applied to the bearings housed within the upper portion of the structure and in addition may pass downwardly between the relatively rotatable parts 3 and 4 to the bearings at the lower end of the structure. Lubricant distributing passages 32 are arranged in the hub 3 and the lugs 24 in such manner as to deliver lubricant from the central reservoir to the radial bearings provided for the pivot pins 25 (see Fig. 2). In this way, when a relatively fluid lubricant is employed, the reservoir provided causes the main radial and thrust bearings to be well supplied at all times and, in addition, such lubricant will be delivered under the influence of centrifugal force, during rotation of the wing system, through the ducts or passages 32 to the bearings in the wing pivot structure.

The present invention also contemplates the use of a gear such as indicated at 33, which is mounted to revolve with the hub 3 and which co-operates with an additional gear member 34 to drive a shaft 35, to which the gear 34 is fixed. The shaft 35, of course, may be supported on a stationary part of the rotor head by any suitable means such as the bracket indicated at 36. This driving mechanism may advantageously be employed to actuate some suitable tachometer or rotor speed indicator, preferably by the extension of the shaft 35 or some other operatively associated mechanism downwardly into the cockpit of the craft.

The operation of the structure should be quite apparent from the foregoing, but it might be mentioned that the relative disposition of various of the thrust and radial bearings in spaced relation to each other and at opposite sides (above and below) of the points of attachment of the blades to the supporting structure, is important in uniformly distributing the load as well as various thrusts under all conditions of operation and in addition, when the craft is at rest on the ground. Finally, it should be borne in mind that the lubrication features of the present invention provide for a very effective and constant lubrication of all the working parts immediately associated with the structure from a common source of supply or reservoir.

In conclusion, and from the foregoing consideration, it will be apparent that the objects and advantages generally pointed out hereinbefore are obtained by the use of a rugged, dependable and yet simple form of apparatus.

I claim:

1. In an aircraft having rotatable sustaining blades, a mounting structure for the blades including cooperating relatively rotatable members one of which is associated with the body of the craft and the other of which is associated with said blades, and sets of bearings between said members, the sets being spaced from each other and each set including radial and thrust bearing parts.

2. In an aircraft having rotatable sustaining blades, a mounting structure for the blades including cooperating relatively rotatable members one of which is associated with the body of the craft and the other of which is associated with said blades, and sets of bearings between said members, the sets being spaced from each other and each set including radial and thrust bearing parts with the thrust bearing parts of the sets arranged to receive thrusts in opposite directions.

3. In an aircraft having rotatable sustaining blades, a mounting structure for the blades including cooperating relatively rotatable members one of which is associated with the body of the craft and the other of which is associated with said blades, and sets of bearings between said members, the sets being spaced from each other and each set including radial and thrust bearing parts with the thrust bearing parts of one set arranged to receive thrust incident to sustension of the craft from the blades and with the thrust bearing parts of the other set arranged to receive thrust incident to support the blades on the craft when they are not effective to sustain the craft.

4. In an aircraft having rotatable sustaining blades, a mounting structure for the blades including cooperating relatively rotatable members one of which is associated with the body of the craft and the other of which is provided with means for pivotal attachment of the blades thereto, a lubricant reservoir formed, at least in part between said members, and means for delivering lubricant from said reservoir to the pivot means.

5. In an aircraft having rotatable sustaining blades, a mounting structure for the blades including cooperating relatively rotatable members one of which is associated with the body of the craft and the other of which is provided with means for pivotal attachment of the blades thereto, a bearing between said members, and means for lubricating said bearing and said pivot means including a lubricant reservoir formed, at least in part, by said members.

6. In an aircraft having rotatable sustaining blades, a mounting structure for the blades including cooperating relatively rotatable members one of which is associated with the body of the craft and the other of which is provided with means for pivotal attachment of the blades thereto, a bearing between said members, and means for lubricating said bearing and said pivot means including a lubricant reservoir formed, at least in part, by said members and distributing passages communicating with said reservoir and said pivot means.

7. In an aircraft having rotatable sustaining blades, a mounting structure for the blades including cooperating relatively rotatable members one of which is associated with the body of the craft and the other of which is provided with means for pivotal attachment of the blades thereto, a bearing between said members, and a lubricant reservoir supplying said bearing and said pivot means with lubricant.

8. In an aircraft having rotatable sustaining blades, a mounting structure for the blades including cooperating relatively rotatable members one of which is associated with the body of the craft and the other of which is provided with means for pivotal attachment of the blades thereto, and means operative under the influence of centrifugal force during rotation of the blades to deliver lubricant to said pivot means.

9. In an aircraft having rotatable sustaining blades, a mounting structure for the blades including cooperating relatively rotatable members one of which is associated with the body of the craft and the other of which is provided with means for pivotal attachment of the blades thereto, a lubricant reservoir associated with at least one of said members, and means operative under the influence of centrifugal force, during rotation of the blades, to deliver lubricant from said reservoir to said pivot means.

10. In a rotative hinged-wing system of the type described, a supporting member to which the wings are jointed consisting of a housing containing lubricant and mounted on a shaft by means of two or more thrust bearings arranged towards the top and one towards the bottom of the supporting member and acting respectively to support the body of the aircraft on the wings in flight, and to support the wings on the shaft when at rest, with radial rolling bearings to take the rotation.

11. A lubricating system for the mechanism of the preceding claim in which lubricant is delivered from a reservoir in the upper part of the supporting member by gravity to the lower bearings, and centrifugally to the bearings in the hinge joints of the wings.

12. In an aircraft sustaining rotor construction of the rotatable blade or wing type, an axis structure for the blades including cooperating relatively rotatable members spaced from each other and adapted to be mounted above the body of the craft, one of said members being associated with the body of the craft and another of which has means for the attachment of blades thereto, bearing means associated with said members and disposed adjacent to the blade attachment means, and means for lubricating said bearing means including a lubricant reservoir formed, at least in part, in the space between said members adjacent said bearing means.

13. For an aircraft of the rotative sustaining wing type, an upright axis structure mounted so that it may be rotated with the wings under the action on the latter of relative air flow, means for pivotally securing a wing to said structure so that it may substantially freely swing under the variable forces encountered in flight, including a pivot part, and means for journalling said last mentioned means including roller bearings, and fixed housing structure for the roller bearings secured to said axis structure and of considerable width in a direction axially of the pivot part so as to provide ample space to receive the roller bearings and adequate surface to support them.

14. For an aircraft of the rotative sustaining wing type, an upright axis structure mounted so that it may be rotated with the wings under the action on the latter of relative air flow, means for pivotally securing a wing to said structure so that it may substantially freely swing under the variable forces encountered in flight, including a pivot part, and means for journalling said last mentioned means including a pair of spaced-apart bearing housings fixed to said axis structure, apertured to receive the wing pivot part, and each recessed to receive anti-friction bearings, and anti-friction bearings inserted at the outer sides of said housings and journalling said pivot part therein.

15. In an aircraft of the type having normally wind driven rotative wings, a rotative axis structure for the wings, relatively fixed supporting structure for said axis structure, anti-friction bearing means between the rotative axis structure and the fixed supporting structure, and means providing for free rotation of said axis structure in the event of failure of said bearing means.

16. In an aircraft of the type having normally wind driven rotative wings, a rotative axis structure for the wings, relatively fixed supporting structure for said axis structure, anti-friction bearing means between the rotative axis structure and the fixed supporting structure, and means providing for free rotation of said axis structure in the event of failure of said bearing means, said last mentioned means including another anti-friction bearing device.

JUAN DE LA CIERVA.

CERTIFICATE OF CORRECTION.

Patent No. 1,936,752.　　　　　　　　　　　November 28, 1933.

JUAN de la CIERVA.

It is hereby certified that error appears in the printed specification of the above numbered patent requiring correction as follows: Page 2, line 54, for "prevent" read preventing; and line 145, claim 3, after "support" insert the word of; and that the said Letters Patent should be read with these corrections therein that the same may conform to the record of the case in the Patent Office.

Signed and sealed this 9th day of January, A. D. 1934.

(Seal)

F. M. Hopkins
Acting Commissioner of Patents.